United States Patent

[11] 3,540,513

[72] Inventors Shinzo Sumiya,
Yasuo Morimoto, Osaka-fu, Japan
[21] Appl. No. 767,124
[22] Filed Oct. 14, 1968
[45] Patented Nov. 17, 1970
[73] Assignee Daido Chemical Engineering Corporation
Osaka-shi, Japan

[54] APPARATUS FOR TREATING A PICKLING WASTE
2 Claims, 1 Drawing Fig.

[52] U.S. Cl.................................................... 159/2,
159/45, 23/126, 23/273, 62/58, 203/48
[51] Int. Cl...................................................... B01d 1/00
[50] Field of Search.......................................... 159/45,
Dec., 2MS; 23/273, 274, 126: Inquired Tagman,
Emery; 62/58; 203/48; 23/306, 307

[56] References Cited
UNITED STATES PATENTS

| | | | |
|---|---|---|---|
| 2,078,088 | 4/1937 | Mantius et al. | 23/126X |
| 2,648,594 | 8/1953 | Olson | 23/273X |
| 3,332,470 | 7/1967 | Chirico et al. | 159/47 |
| 3,387,927 | 6/1968 | Goldberger | 23/126 |

Primary Examiner—Norman Yudkoff
Assistant Examiner—J. Sofer
Attorney—Larson, Taylor, & Hinds ABSTRACT: In treating a pickling waste by self-evaporation in primary and secondary evaporators, the apparatus is characterized by the presence of means for cooling the concentrated liquid from the secondary evaporator, means for introducing the cooled liquid from said cooling means to a secondary condenser connected to said secondary evaporator and means for introducing the liquid from the secondary condenser to a heat exchanger connected to the primary evaporator.

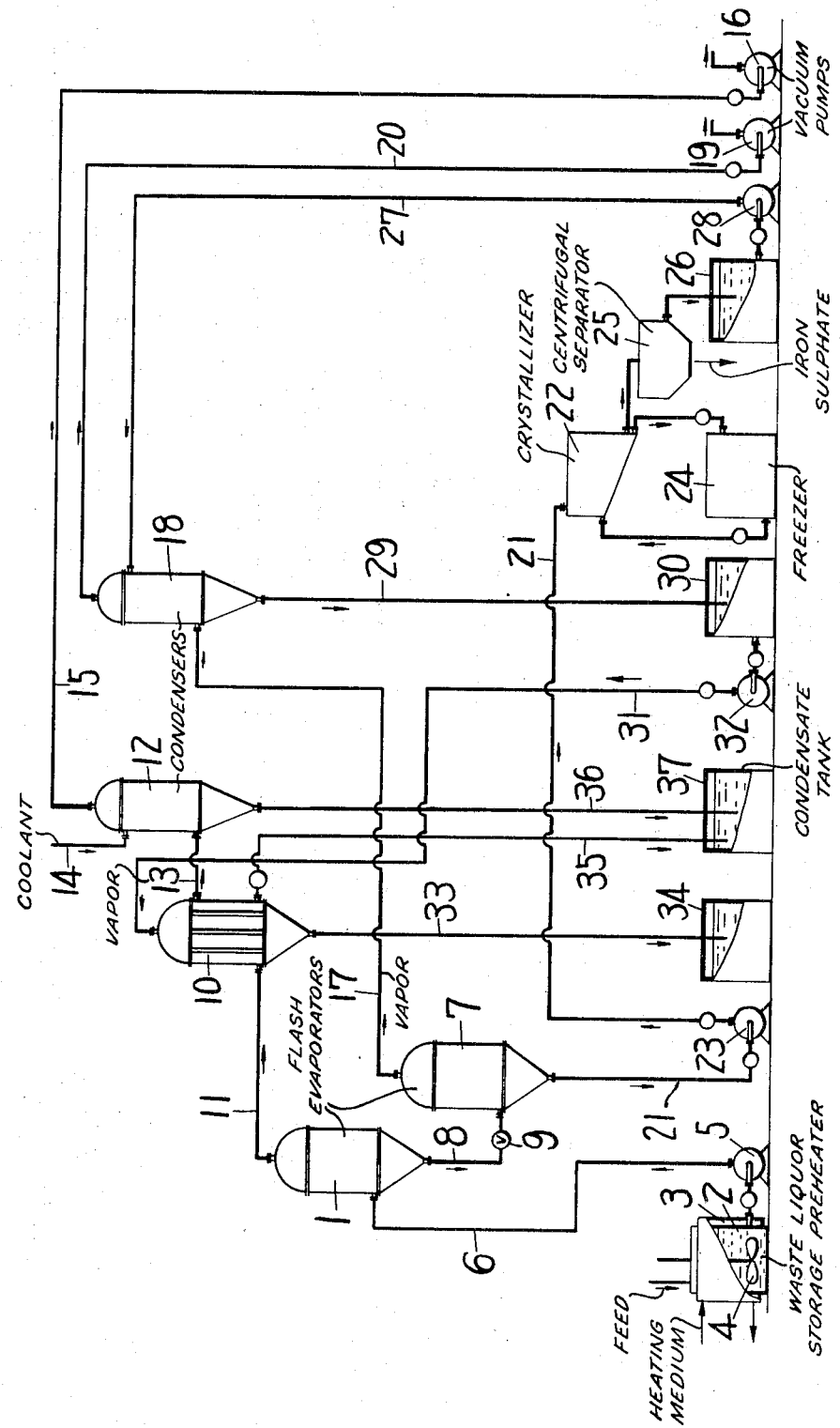

APPARATUS FOR TREATING A PICKLING WASTE

This invention relates to an improved disposal of pickling wastes, and more particularly to an apparatus for recovering sulfuric acid and ferrous sulfate heptahydrate from pickling wastes.

The disposal of pickling wastes produced when steel is pickled with sulfuric acid is a serious problem in the steel industry. Many attempts have been made to treat the pickling waste for recovering sulfuric acid and ferrous sulfate therefrom. In general, the pickling wastes have been concentrated by vacuum evaporation. In the apparatuses known in the art, however, in order to increase recovering efficiency it is usually necessary to use a large amount of steam for producing a sufficient vacuum in evaporator and to use a large amount of water for condensation of the vapor generated, which makes such treatment uneconomical and complex and requires large scale apparatuses.

A main object of the invention is to afford improved disposal of pickling wastes, which can overcome the above drawbacks in the prior art.

Another object of the invention is to provide an apparatus for treating pickling wastes, in which sulfuric acid and ferrous sulfate can be recovered advantageously with a relatively simple apparatus.

Further object of the invention is to provide an apparatus for treating pickling wastes in which the amount of steam and water to be employed can be reduced with improved recovering efficiency of sulfuric acid and ferrous sulfate.

Still further object of the invention is to provide an apparatus for treating pickling wastes in which the sulfuric acid solution recovered therefrom can be used as a pickling liquor as it is without heating or dilution.

These and other objects of the invention which will be apparent from the following description can be attained by an apparatus for treating a pickling waste which comprises primary and secondary self-evaporators for concentrating a pickling waste to be treated, said secondary self-evaporator being connected to said primary evaporator, a heat-exchanger connected to said primary evaporator, a primary condenser connected to said heat-exchanger, a secondary condenser connected to a said secondary evaporator, two vacuum generating means respectively connected to said primary and secondary condensers, means for cooling the concentrated liquid from said secondary evaporator to precipitate ferrous sulfate heptahydrate, means for introducing the cooled liquid from said cooling means to said secondary condenser to said heat-exchanger.

One preferred embodiment of the apparatus of the invention is illustrated in the accompanying drawing which is a diagrammatic side view of the apparatus.

Referring now to the drawing, one side of a primary self-evaporator 1 is connected to a pickling waste storage tank 2 with a preheater 3 and stirrer 4 by means of a pump 5 and pipe 6. The bottom of the primary self-evaporator 1 is connected to one side of a secondary self-evaporator 7 by means of a pipe 8 through a valve 9, and the top of the primary evaporator 1 is connected to a heat-exchanger 10 through a pipe 11. The upper side of the heat-exchanger 10 is connected to the lower side of a primary condenser 12 through a pipe 13, the upper side of the primary condenser 12 being connected to a pipe 14 for introducing cooling water. Through a pipe 15, the top of the condenser 12 is connected to a vacuum generator 16, such as vacuum pump, ejector, water-jet pump, etc. The top of the secondary self-evaporator 7 is connected through a pipe 17 to the lower side of a secondary condenser 18, the top of which is connected to a vacuum generator 19, such as vacuum pump, ejector, water-jet pump, etc., through a pipe 20, and the bottom of the secondary evaporator 7 is connected through a pipe 21 to a crystallizer 22 with a pump 23 interposed therebetween. The crystallizer 22 is provided with a freezer 24, and the bottom of said crystallizer 22 is connected to a centrifugal separator 25, to which a mother liquid storage tank 26 is connected. By means of a pipe 27, the mother liquid storage tank 26 is connected to the upper side of the secondary condenser 18 with a pump 28 interposed between the tank 26 and the condenser 18. Through a pipe 29, the bottom of the secondary condenser 18 is connected to a storage tank 30 which is further connected through a pipe 31 to the top of the indirect heat-exchanger 10. A pump 32 is interconnected to the tank 30 and the exchanger 10. Indicated as at 33 is an exhaust pipe attached to the heat-exchanger 10, and 34 is a storage tank connected thereto. Drain pipes 35 and 36, respectively attached to the heat-exchanger 10 and the primary condenser 12, are both connected to a receptacle 37.

One of the preferred examples for treating sulfuric acid pickling wastes by using the apparatus constructed as above is illustrated below.

The pressures in the primary self-evaporator 1 and secondary self-evaporator 7 are respectively reduced to 40 mm. Hg and 10 mm. Hg by means of the respective vacuum generators 16 and 19. The pickling waste containing 18.2 weight percent of $H_2SO_4$ and 12.8 weight percent of $FeSo_4$ is preheated at 80°C. in the storage tank 2 by means of the preheater 3 and introduced through the pump 5 and pipe 6 to the primary self-evaporator 1 at the rate of 9,300 kg/hr., the pickling waste further being sent forward from the primary evaporator 1 to the secondary evaporator 7 through the pipe 8. The pickling waste in the primary and secondary evaporators 1 and 7 vaporizes until the temperatures of the liquid in each of the evaporators drops to the boiling point corresponding to the reduced pressure in each evaporator. Thus the liquid temperature in the primary evaporator drops to 39°C. and that in the secondary evaporator drops to 23°C. by self evaporation, the vapor thereby being produced in the primary evaporator 1 at the rate of 530 kg/hr. and in the secondary evaporator 7 at the rate of 190 kg/hr. by self evaporation. The pickling waste thus concentrated is now introduced from the secondary evaporator 7 to the crystallizer 22 through the pump 23 and pipe 21, and cooled to −5°C. by the freezer 24 while circulating through the freezer, thus precipitating crystals of ferrous sulfate heptahydrate. Such crystals are separated from the mother liquid by the centrifugal separator 25 to produce ferrous sulfate heptahydrate at the rate of 1,800 kg/hr. and the mother liquid containing 25 weight percent sulfuric acid and 3 weight percent ferrous sulfate at the rate of 6,780 kg/hr. The mother liquid cooled at −5°C. is then sent into the storage tank 26, from which it is introduced to the upper side of the secondary condenser 18. The mother liquid introduced to the condenser 18 contacts with the vapor conducted through the pipe 17 into the condenser 18 from the secondary evaporator 7 to condense the vapor completely. Thus the temperature of the mother liquid rises to 16°C. and the concentrations of sulfuric acid and ferrous sulfate respectively drop to 24.3 weight percent and 2.9 weight percent. The liquid, thereafter introduced to the storage tank 30 through the pipe 29, is further forwarded to the top of the indirect heat-exchanger 10 through the pipe 31 by means of the pump 32 to heat-exchange with the vapor introduced to said heat-exchanger 10 from the primary evaporator 1 through the pipe 11, and stored in the storage tank 34 through the pipe 33. Thus recovered liquid contains 24.3 weight percent sulfuric acid and 2.9 weight percent ferrous sulfate and has a temperature of 28°C., so that the liquid can be used as the pickling liquor as it is without heating or dilution. The vapor heat exchanged is conducted to the primary condenser 12 through the pipe 13 and contacts with cooling water supplied from the pipe 14 to condense. The condensate is drained from the line 36 to the receptacle 37.

According to the apparatus of the invention, the vapor generated in secondary evaporator is delivered into secondary condenser, where, as described above, recovered sulfuric acid cooled by freezer is utilized to completely condense said vapor, so that vacuum in evaporator can be maintained by using a small vacuumizer without using a large volume of steam or vacuum generator having high capacity.

Further, part of the vapor generated in the primary self-evaporator is heat-exchanged with the recovered sulfuric acid and condensed, and the rest of the vapor is completely condensed in the primary condenser by cooling water, which allows maintenance of vacuum in the primary evaporator by using a vacuumizer of small suction and cooling water sufficient only to condense part of the vapor. Moreover, the recovered sulfuric acid is diluted with condensed water in secondary condenser, and heated in the condenser and heat-exchanger, so that it is not necessary in the reuse of the recovered sulfuric acid to dilute or heat it, but it can be directly reused for acid treatment of steel.

The apparatus of the invention is made of or lined with materials having resistant property to the corrosive action of the pickling wastes to be treated.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

We claim:

1. An apparatus for treating a pickling waste, which comprises primary and secondary self-evaporators for concentrating a pickling waste to be treated, said secondary self-evaporator being connected to said primary evaporator, to receive concentrate therefrom, heat-exchanger connected to said primary evaporator, to condense the vapor released therefrom direct primary condenser connected to said heat-exchanger, to condense any vapors not condensed in the indirect heat-exchanger, a direct secondary condenser connected to said secondary evaporator to condense the vapors released therefrom, two vacuum generating means respectively connected to said primary and secondary condensers to reduce and maintain the pressure in said primary and secondary self-evaporators, means for cooling the concentrated liquid from said secondary evaporator to precipitate ferrous sulfate heptahydrate, means for introducing the cooled liquid from said cooling means to said secondary condenser and means for introducing the liquid condensate and coolant from the secondary condenser to said indirect heat-exchanger as cooling medium.

2. The apparatus for treating a pickling waste according to claim 1, in which said cooling means comprises a crystallizer, freezer and centrifugal separator.